United States Patent [19]

Huther

[11] 4,450,314
[45] May 22, 1984

[54] THERMOCOUPLE FOR MEASURING TEMPERATURES AND METHOD OF MAKING THE THERMOCOUPLE

[75] Inventor: Werner Huther, Karlsfeld, Fed. Rep. of Germany

[73] Assignee: MTU Motoren-und Turbinen Union Munchen GmbH, Munich, Fed. Rep. of Germany

[21] Appl. No.: 404,014

[22] Filed: Aug. 2, 1982

[30] Foreign Application Priority Data

Aug. 14, 1981 [DE] Fed. Rep. of Germany ....... 3132237

[51] Int. Cl.³ ............................................. H01L 35/02
[52] U.S. Cl. ...................................... 136/230; 29/573; 136/201; 136/239; 136/242
[58] Field of Search ................... 29/573; 136/230, 239, 136/242, 201

[56] References Cited

U.S. PATENT DOCUMENTS 4,209,474  7/1980  Prochazka ........................... 264/29.6
4,368,416  1/1983  James .................................. 136/205

FOREIGN PATENT DOCUMENTS 675177  12/1963  Canada ................................ 136/239

OTHER PUBLICATIONS

Fitterer, Trans. A.I.M.E., vol. 105, (1933), pp. 291, 292, 293.

Primary Examiner—Leland A. Sebastian
Attorney, Agent, or Firm—Alan H. Levine

[57] ABSTRACT

A thermocouple made of the silicon carbide and carbon. A carbon rod extends within a silicon carbide tube. The tube is closed at one end, and one end of the rod is fixed in a blind hole in the tube end to define the hot junction of the thermocouple, the hot junction thereby being located within the tube. An electrical insulator sealing ring closes off the opposite end of the tube. The tube is made by sintering a preform, the rod being within the tube, with one end in the blind hole, during sintering, so that the hole wall shrinks around the rod end.

4 Claims, 1 Drawing Figure

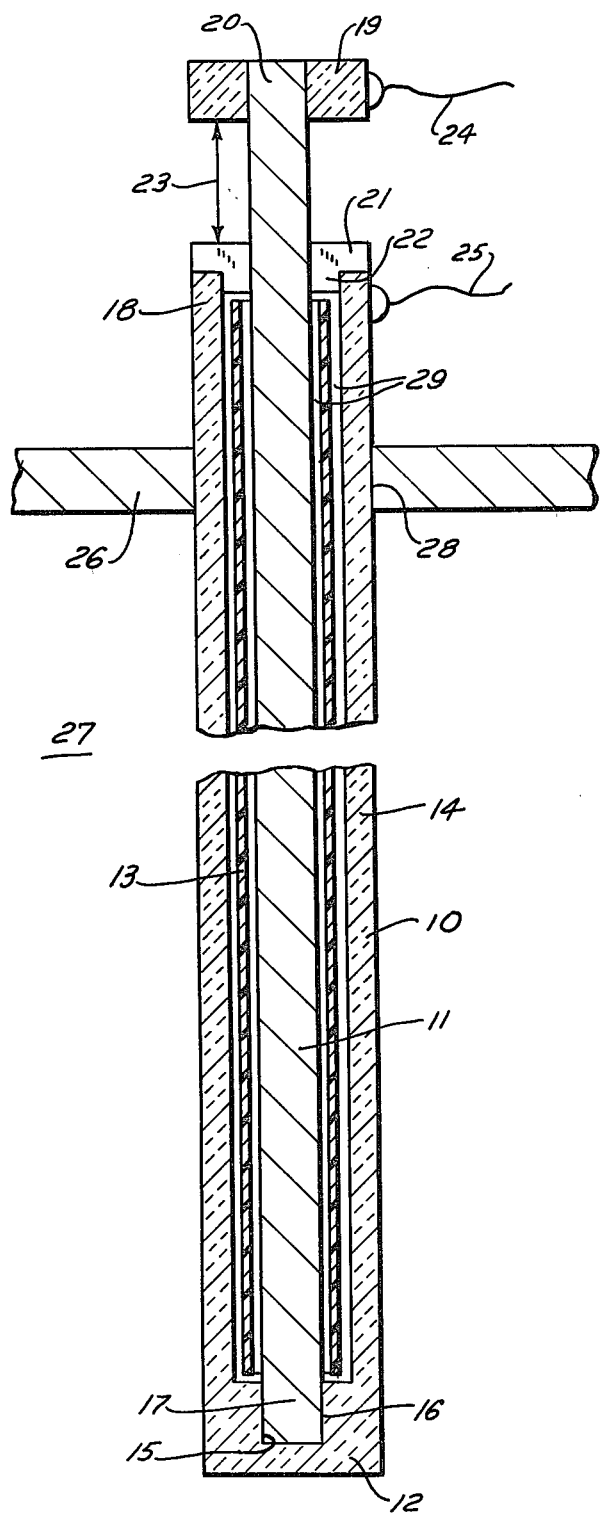

THERMOCOUPLE FOR MEASURING TEMPERATURES AND METHOD OF MAKING THE THERMOCOUPLE

This invention relates to a thermocouple for measuring temperatures. Coordinately, it relates to a method for manufacturing such a thermocouple.

For thermocouples to operate at temperatures above 2000° C., use is presently being made of paired tungsten/tungsten rhenium alloy or of paired tungsten rhenium alloy/tungsten rhenium alloy, where one conductor, leg, or the like, of the thermocouple or of the paired thermomaterials is made of tungsten and the other conductor, leg, or the like, of the thermocouple or the paired thermomaterials consists of, e.g., 95% tungsten and 5% rhenium, indicated as W-5% Re, or the combination or thermocouple is W-5% Re/W-26% Re, for instance.

To protect it from environmental effects, the thermocouple is usually housed inside a sheath of molybdenum, tantalum, or niobium. Interposed between the sheath and the thermocouple is an electrical insulator, such as magnesium oxide (MgO), beryllium oxide (BeO), or the like.

This construction is encumbered by several disadvantages. At temperatures above 2000° C., diffusion occurs between the paired thermocouple materials or the thermocouple metal alloys. This widens and blunts the transition (hot junction) from one material to another in the probe of the thermocouple. The thermoelectric potential of the thermocouple then drops and the measurements become inaccurate. Additionally, the insulator becomes electrically conductive and causes short circuits, which again reduces the thermoelectric potential. Another consideration is that thermocouples or paired thermomaterials are suitable for use only in certain atmospheres (rare gases, nitrogen ($N_2$), hydrogen ($H_2$)). In the presence of oxygen ($O_2$) or carbon (C), carbide or oxides are formed which quickly destroy the probe. The thermocouples cannot be used in furnaces containing hot graphite components whenever temperatures exceed 2000° C.

In a broad aspect, the present invention provides a thermocouple, for measuring temperatures, for use at temperatures to at least 2300° C. in atmospheres containing carbon or additionally to at least 1600° C. in an atmosphere containing oxygen, the resistance of the thermocouple to long-term exposure being improved.

It is a particular object of the present invention to provide a thermocouple wherein silicon carbide and carbon are the paired thermomaterials.

Considering thermoelectric potential, such a thermocouple is well-suited for use in temperature measurements. Also, the semiconductors silicon carbide (SiC) and carbon (C) will react, if the reaction of carbon (e.g., graphite) with oxygen of metals is ignored for the moment, considerably less rapidly with said atmospheres and to said thermal effects than the metals and alloys of said or other known paired materials of thermocouples for use at said high temperatures. This aspect of the present invention is adequately served by the present invention.

It is contemplated that the term silicon carbide of the thermocouple also embraces materials comprising essentially silicon carbide, i.e., having a silicon carbide contact of at least about 90%, the remainder being an addition or additions. This comment applies similarly to the carbon contained in the thermocouple. The carbon of the thermocouple, more particularly, is vitreous graphite, graphite, or technical carbon. The silicon carbide conductor, leg, or the like, of the thermocouple of the present invention is made, more particularly, by sintering a preform made of sinterable silicon carbide.

A feature of the invention involves a thermocouple including a silicon carbide tube and a carbon rod within and along the whole tube, the rod and tube are radially spaced from each other, one end of the tube being closed and that end together with the corresponding end of the rod forming the hot junction of the thermocouple. This construction provides an advantage in that the tendency of carbon materials, when exposed to atmospheric effects, to oxidation and formation of metal carbides from metal vapors, is alleviated. The other tube end, being often exposed in operation to oxygen in the atmosphere, can readily be sealed. The carbon rod, forming one conductor of the thermocouple, and the hot junction of the thermocouple, are screened from the atmosphere in the probe area, for they are located in the tube constituting the other conductor of the thermocouple. The probe end of the thermocouple is sealed and the material, or silicon carbide, of the tube is practically if not ideally impermeable to gas. The hot junction, or transition from carbon to silicon carbide, is arranged in the zone of the closed tube end of the thermocouple inside the tube, so that the atmosphere of the probe area, e.g., the interior of a furnace, will be in contact only with the silicon carbide tube.

In a further aspect of the present invention the lead-in for the thermocouple or tube in a wall of the probe area is sealed to exclude gas. The hot junction is simple to manufacture and the transition is well defined, by fixing one end of the rod within a blind hole at the closed end of the tube. The rod is arranged at a distance from the tube and over its entire length. An insulating tube or powder between the rod and thermocouple tube serves to prevent contact should the tube and/or rod suffer deformation, particularly plastic deformation. The material of the insulating tube and of the powder is preferably titanium nitride (TiN), titanium carbide (TiC), boron nitride (BN), boron carbide ($B_4C$), or silicon nitride ($Si_3N_4$), or a composition containing at least two of these materials.

The silicon carbide of the thermocouple tube is at least generally impermeable to gas, or preferably practically or when possibly impermeable to gas. For added protection from gas leakage, metallic silicon can be used as an addition to the carbide of the tube. The silicon carbide may be sintered $\alpha$- or $\beta$-silicon carbide, and may include boron or aluminium and free carbon. While the invention can utilize any grade or type of silicon carbide, it should be impermeable or practically impermeable to gas, however, when used for the tube or the like. The additions to said $\alpha$- or $\beta$-silicon carbide are employed especially as sintering agents added before sintering. They operate, or they also operate, to make the silicon carbide impermeable to gas.

The other end of the rod may project from the other end of the tube, wherein a silicon carbide ring is at this rod end and metallic leads extend from the ring and from this tube end, thereby serving to avert complications in the train of dissimilar temperatures at the contact points of the metallic connections at the cold end of the thermocouple. An insulating part or ring may be provided to serve to electrically insulate and secure the rod relative to this tube end. The insulating ring may be a sealing ring. The insulating ring may be composed of two ring halves.

The invention also relates to a method of manufacturing the thermocouple, wherein a tubular preform is sintered while the rod is within it. This method provides, among other benefits, a proper area of contact designed to remain intact. Another advantage is afforded if the insulating ring, when being attached, is bonded, brazed, or otherwise secured to the and the tube end for sealing effect to screen the atmosphere in the interior of the thermocouple from the environment of the cold end of the thermocouple. This safely prevents the hot junction from being exposed to interference from atmospheric effects, especially from oxygen.

The single FIGURE of the drawing is a schematic, longitudinal cross-sectional view illustrating an embodiment of the tube-and-rod thermocouple of the present invention.

The rod 11 and the tube 10 are coaxially arranged, rotationally symmetrical. The tube 10 is made of silicon carbide and is, e.g., 5 mm in OD, whereas the rod 11 is made of graphite, is a solid cylinder, and is, e.g., 2 mm in diameter. The tube 10 is closed at its lower end by a bottom 12 or head forming a single piece with the cylindrical portion 14 of the tube 10. The bottom 12 has a blind hole 15 opening towards the inside.

The hot junction 16 is formed by one end 17 of rod 11 being firmly seated in the blind hole 15. The junction 16, accordingly, is located within the interior of the tube 10. The firm fit is achieved by shrinkage caused during the sintering operation. The rod 11 projects from the end 18 of tube 10, and a ring 19 is formed on the rod end 20 by a sintering process. The ring 19 is made of silicon carbide.

Also provided is a split insulating and sealing ring 21, only one ring half being shown in the drawing. The insulating and sealing ring 21 is made, e.g., of alumina ($Al_2O_3$) or an organic synthetic material. It reaches into the tube end 18 with its axially extending projection 22, and it is brazed or bonded thereto. The interior 29 of the tube 10 is therefore completely closed.

Between the two rings 19 and 21, an axial gap 23 is provided. From the tube end 18 and from the ring 19, metallic connections 24 and 25 lead to a measuring instrument, an actual value input end of a control unit, or a similar device, not shown in the drawing.

The tube 10 extends through a wall 26 of a hot gas containing probe area 27. The lead-in is sealed at 28 impermeable to gas. The tube 10, when viewed axially, has its greater part inside, and its smaller part outside, the probe area 27. The rings 19 and 21 are arranged outside the probe area 27 in an environment full of air.

Between the tube 10 and the rod 11 is an electric insulating tube 13 of, e.g., titanium nitride (TiN), having a thickness less than the radial distance between the tube 10 and the rod 11.

In a further aspect of the present invention, the silicon carbide of the ring 19 is a material that has a silicon carbide content of at least 90%, the remainder being an addition or additions.

The thermocouple may be manufactured, according to the invention by providing a tubular preform made of sinterable silicon carbide. The preform has blind hole 15 in tube bottom 12. Carbon rod 11 is inserted into the tubular preform and its end 17 seating within hole 15. The preform is then sintered to form tube 10. The shrinkage of the silicon carbide due to the sintering operation causes the walls of hole 15 to shrink around and tightly grip rod end 17. Preferably, a sinterable silicon carbide preform ring, which will become ring 19, is also placed around rod 11 prior to sintering, so that it too shrinks on to the rod. After sintering is complete, split ring 21 is arranged to close end 18 of tube 10.

The invention has been shown and described in preferred form only, and by way of example, and many variations may be made in the invention which will still be comprised within its spirit. It is understood, therefore, that the invention is not limited to any specific form or embodiment exept insofar as such limitations are included in the appended claims.

I claim:

1. A method of making a thermocouple comprising the steps of providing a sinterable silicon carbide tube preform, the tube having a closed end and a blind hole in the closed end opening into the interior of the tube, inserting a carbon rod into the tube so that one end of the rod seats in the blind hole, and thereafter sintering the tube, the shrinkage of the tube material due to sintering causing it to tightly grip the rod end located within the blind hole.

2. A method as defined in claim 1 including the step of locating a sinterable silicon carbide ring preform around a protion of the rod projecting beyond the tube prior to sintering, whereby shrinkage of the ring due to sintering causes it to tightly grip the rod.

3. A thermocouple as defined in claim 1 including providing an electrical insulator ring split in two arcuate halves, and arranging the ring around rod between the latter and the tube so as to close the end of the tube opposite its closed end.

4. A thermocouple for measuring temperatures, the thermocouple including a silicon carbide tube, a carbon rod within and along the whole tube, the rod and tube being radially spaced from each other, one end of the tube being closed, and one end of the rod engaging the interior of the closed tube end to form the hot junction of the thermocouple, the hot junction being within the tube, and a tube or powder of electrical insulating material within the space between the rod and tube, the thickness of the insulating tube being equal to or less than the radial spacing between the rod and tube.

* * * * *